No. 763,931. PATENTED JUNE 28, 1904.
F. SCHLAIS.
MOTOR VEHICLE.
APPLICATION FILED SEPT. 10, 1903.
NO MODEL. 3 SHEETS—SHEET 1.
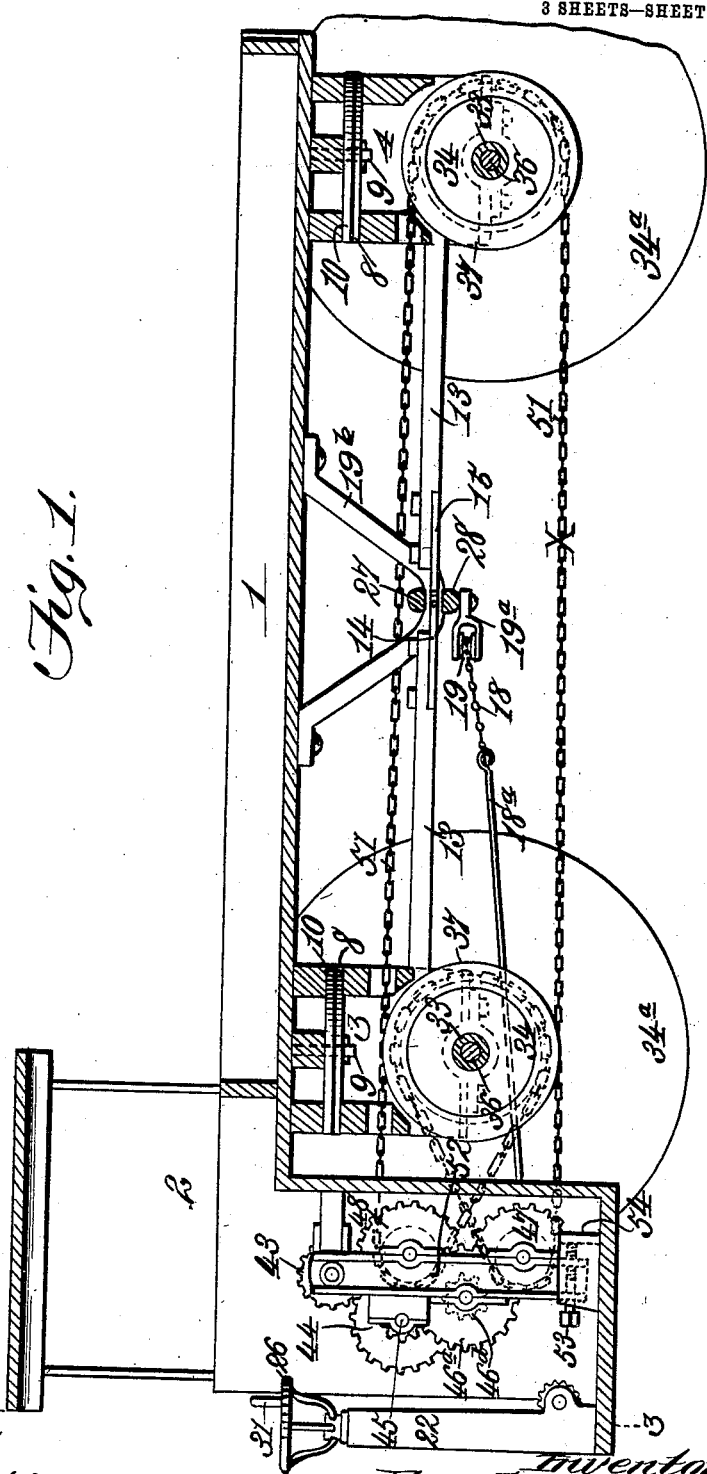

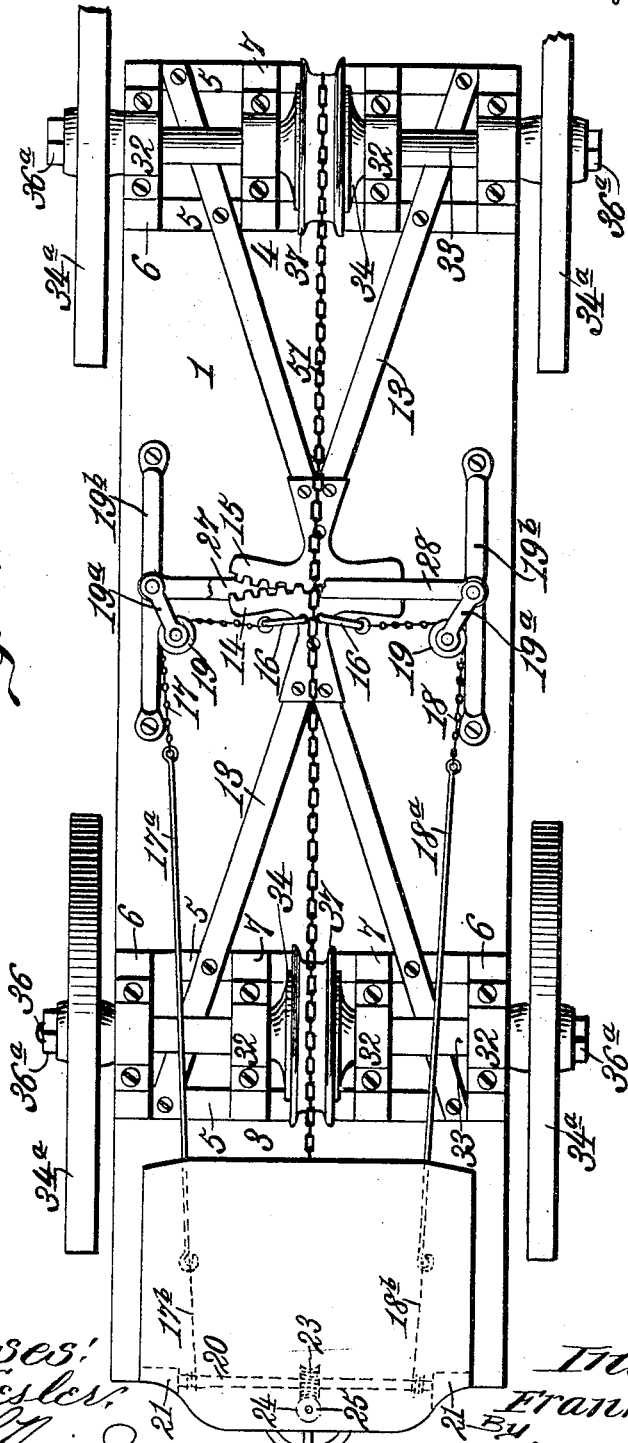

No. 763,931. PATENTED JUNE 28, 1904.
F. SCHLAIS.
MOTOR VEHICLE.
APPLICATION FILED SEPT. 10, 1903.
NO MODEL. 3 SHEETS—SHEET 3.
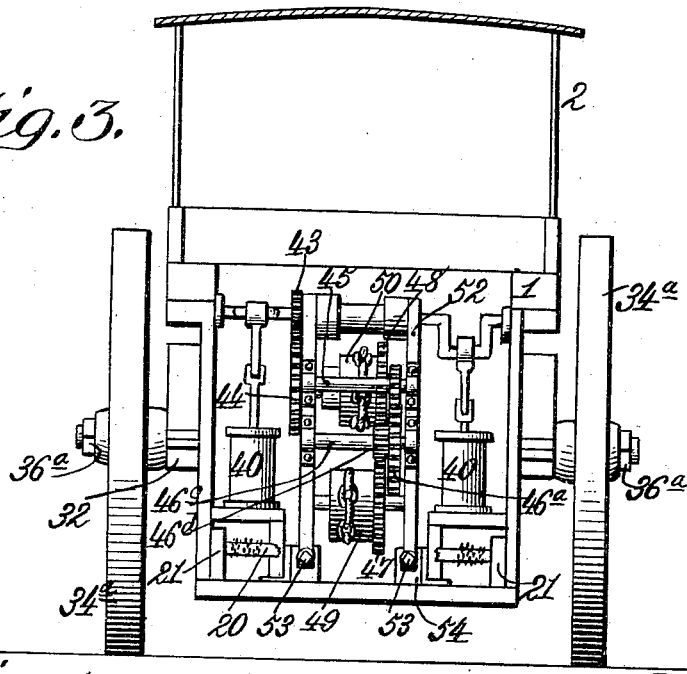
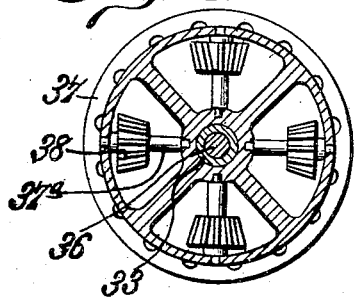
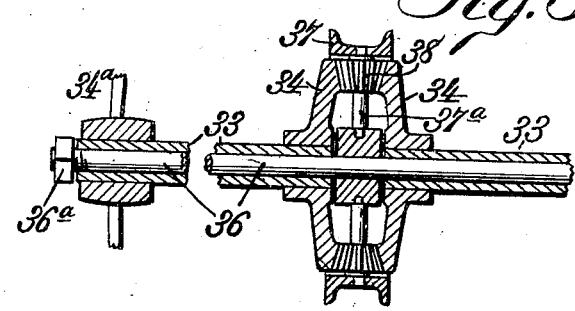
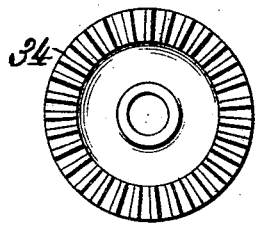
Witnesses:
C. J. Kesler
James L. Norris, Jr.
Inventor
Frank Schlais
By James L. Norris
Atty.

No. 763,931. Patented June 28, 1904.

UNITED STATES PATENT OFFICE.

FRANK SCHLAIS, OF GAD, WISCONSIN.

MOTOR-VEHICLE.

SPECIFICATION forming part of Letters Patent No. 763,931, dated June 28, 1904.

Application filed September 10, 1903. Serial No. 172,661. (No model.)

*To all whom it may concern:*

Be it known that I, FRANK SCHLAIS, a citizen of the United States, residing at Gad, in the county of Taylor and State of Wisconsin, have invented new and useful Improvements in Motor-Vehicles, of which the following is a specification.

This invention relates to motor-vehicles, and has for its object to provide a motor-driven vehicle adapted for carrying heavy loads, which will be strong, light, and durable in construction and may be driven and steered over rough roads with ease and rapidity.

To these ends my invention consists in the features and in the construction, combination, and arrangement of parts hereinafter described, and particularly pointed out in the claims following the description, reference being had to the accompanying drawings, forming a part of this specification, wherein—

Figure 1 is a vertical central longitudinal section of a vehicle constructed in accordance with my invention. Fig. 2 is a bottom plan view of the same. Fig. 3 is a vertical transverse section on the lines 3 3 of Fig. 1. Figs. 4 and 5 are sectional detail views, and Fig. 6 is a face view of one of the double gears.

Referring to the drawings, the numeral 1 indicates the body of the vehicle, provided at one end with a cab 2, adapted to inclose the motor machinery and to afford shelter from the weather for the operator.

The body 1 of the wagon is mounted on two trucks 3 and 4, each comprising two bolsters 5, which are united at their opposite ends 6 and intermediate their ends by beams 7. Secured centrally to each of the trucks is a thick and strong metallic plate 8, through which passes a king-bolt 9, said king-bolt also passing through a plate 10, bolted to the under side of the body of the vehicle. To the opposite ends of each of the trucks are secured hounds, each comprising a pair of beams 13, converging toward their ends, and said inner ends of the hounds are provided with toothed sectors 14 and 15, which engage each other. One of the sectors, as 14, is provided with hooks 16, and to said hooks are secured chains 17 and 18, which pass around the guide-pulleys 19, which are mounted in brackets $19^a$, secured to hangers $19^b$, attached to the under side of the bed 1. The chains 17 and 18 are attached to rods $17^a$ and $18^a$, which pass into the cab, and said rods are in turn attached to chains $17^b$ and $18^b$. Mounted in suitable bearings 21 in the cab is a horizontal shaft 20, around which the ends of the chains $17^b$ and $18^b$ are reversely wound. Fixed centrally on said shaft is a gear-wheel 23, which is engaged by a worm 24, fixed on a vertical shaft 25, that is mounted in a hollow inclined tubular casing 22.

As stated, the chains $17^b$ and $18^b$ are reversely wound on the shaft 20, and hence it will be obvious that if the worm 24 be rotated in one direction by means of the hand-wheel 26 it will through the medium of the gear-wheel 23 rotate the shaft 20, and the sectors 14 and 15 will thus be moved to either one or the other side of the longitudinal center of the vehicle-body, and hence the trucks carrying the axles and ground-wheels will be turned in opposite directions—that is to say, for example, the forward truck will be turned toward the right and the rear truck toward the left—thus enabling the vehicle to make a short and quick turn.

Sectors 14 and 15 are guided between two pairs of guide-rails 27 and 28, said guide-rails being arranged above and below the sectors in parallelism and are secured at their ends to the hangers $19^b$. The end wheel 26 is preferably provided with a handle 31, whereby the operator may rotate it with one hand.

Arranged to rotate in suitable bearings 32, attached to the under side of both of the trucks, are divided sleeves, each consisting of two rotatable tubes 33, which have rigidly fixed upon their outer ends traction-wheels $34^a$ and near their inner ends have rigidly fixed thereon bevel gear-wheels 34, and passing through said sleeves are steel rods or axles 36, threaded at their ends and having nuts $36^a$ screwed on said threaded ends for securing the wheels in place. Arranged on each of the rods 36, between the gears 34, is a sprocket-wheel 37, having a plurality of radial shafts 37ª, said shafts being arranged between the spokes of the sprocket-wheel, one end of each of said shafts being journaled in the rim of the sprocket-wheel and the other end thereof journaled in the hub of said wheel, and on each of said shafts near the rim of the sprocket-wheel is fixed a bevel-pinion 38. The pinions 38 engage both of the bevel-gears 35 of each axle, and normally when the vehicle is steering a straight course said pinions are stationary and serve to rotate both of the bevel-gears 35 and the axle and ground-wheel at a uniform speed of rotation.

Arranged in the cab is an engine 40 of any suitable or preferred type, which rotates a crank-shaft, and the latter has mounted on one end a relatively small gear-wheel 43, which in turn engages a relatively large gear-wheel 44, mounted on a shaft 45. A larger gear-wheel 46ª is mounted on the shaft 46ᶜ, and on the shaft 46ᶜ is a gear-wheel 46ᵈ, which gears with two gear-wheels 47 and 48 of equal diameters, said gear-wheels being formed integrally with or attached to the sprocket-wheels 49 and 50.

As shown, one of the sprocket-wheels, as 49, is offset from its corresponding gear-wheel farther than the other sprocket-wheel 50, whereby said sprocket-wheels lie in slightly-different parallel vertical planes for a purpose presently to be made apparent.

It will be apparent from the foregoing that when the crank-shaft is rotated by the engine the described gearing will rotate the sprocket-wheels 49 and 50 in the same direction. Passing around the sprocket-wheel 37 on the rear axle is an endless chain 51, which also passes around the sprocket-wheels 49 and 50 in opposite directions and around the sprocket-wheel 37 on the forward axle—that is to say, starting from the point marked "X" the sprocket-chain 51 passes up around and over the sprocket-wheel on the rear axle, thence along the body of the wagon over and around the sprocket-wheel 49, down under the sprocket-wheel on the front axle, thence up around and over said sprocket-wheel, and from thence around and under the sprocket-wheel 50 back to the point X, where the links are joined together to form an endless chain. The chain referred to is preferably formed of oval links—that is to say, a chain commonly known to the trade as a "logging-chain."

From the foregoing it will be apparent that when the engine is put in operation the two sprocket-wheels 49 and 50 will be rotated in the same direction, and hence the endless chain will rotate the two axles also in the same direction. By offsetting the two sprocket-wheels 49 and 50 the chain is enabled to cross itself without its two portions coming in contact with one another.

As most clearly shown in Fig. 2 of the drawings, the cab 2 is suspended beneath the vehicle, thereby permitting ease of ingress and egress.

The shafts on which the gear and sprocket wheels are mounted are preferably journaled in a swinging frame 52, pivoted at its upper end to any suitable support, such as the engine crank-shaft, for example, and is provided at its lower ends with adjusting-screws 53, which have a bearing against fixed brackets 54. By screwing up said screws the frame 52 will be oscillated about its bearing and will thus take up any slack that may exist in the endless chain 51.

The operation of my motor-vehicle will be readily understood from the foregoing description.

As long as the motor-vehicle is steering a straight course the front and rear axles will be in parallelism, and in such case the bevel-pinions 38 will have no movement independently of the bevel-gears 35, which they engage. When it is desired to turn to either the right or the left, a hand-wheel 26 is turned, causing the worm-gearing to rotate the shaft 20 and to wind up one of the chains 17 or 18 and unwind the other of said chains, thus simultaneously moving the two sectors either to the right or left of a straight line, and thereby simultaneously turning the front and rear axles in opposite directions, by means of which a vehicle is caused to make a quick short turn in the desired direction. While turning, the outermost traction-wheels obviously rotate at a greater speed than the innermost, and at such time the bevel-gears 38 will have a slight rolling action between the bevel-gears 35, with which they are in engagement, thus permitting the outer wheels to revolve faster than the inner wheels.

I have shown my invention as being applied to a wagon; but it will be manifest that it may be employed in connection with vehicles of various different kinds.

Having described my invention, what I claim is—

1. The combination with a motor-vehicle, of two wheeled trucks on which said vehicle is pivotally mounted, hounds rigidly connected to said trucks and provided at their adjacent ends with intermeshing toothed sectors, two chains connected to one of said sectors, means for drawing up one of said chains and simultaneously slacking the other for moving said sectors to the right or left to turn the wheeled trucks simultaneously in opposite directions, and guides for guiding the sectors in their movements, comprising a pair of parallel beams, said beams extending transversely beneath the bed of the vehicle and rigidly connected therewith, one of the beams being arranged above and the other beneath the sectors, substantially as and for the purposes specified.

2. The combination with a motor-vehicle, of two trucks on which said vehicle is pivotally mounted, axles journaled on said trucks and having traction-wheels fixed thereon, sprocket-wheels mounted on said axles, a motor carried by the vehicle, two sprocket-wheels carried by the vehicle and provided with intermeshing gear-wheels, gearing driven by the motor for rotating said sprocket-wheels in the same direction, and an endless chain passing about said geared sprocket-wheels and the sprocket-wheels on the axles, substantially as and for the purpose set forth.

3. The combination with a motor-vehicle, of two wheeled trucks on which said vehicle is pivotally mounted, axles journaled on said trucks and having traction-wheels fixed thereon, sprocket-wheels connected with said axles, a motor carried by the vehicle, two sprocket-wheels carried by the vehicle and provided with intermeshing gear-wheels, gearing driven by the motor for rotating said gear sprocket-wheels in the same direction, an endless chain passing about the sprocket-wheels on the axles, thence about the two gear sprocket-wheels, and after crossing itself, about the sprocket-wheel on the front axle, substantially as and for the purpose specified.

4. The combination with a motor-vehicle, of two wheeled trucks on which said vehicle is pivotally mounted, axles journaled on said trucks and having traction-wheels fixed thereon, sprocket-wheels connected with said axles, a motor carried by the vehicle, two sprocket-wheels carried by the vehicle and provided with intermeshing gear-wheels, said sprocket-wheels being in slightly-different vertical planes, gearing driven by the motor for rotating said gear sprocket-wheels in the same direction, and an endless chain passing about the sprocket-wheel on the rear axle, thence about the gear sprocket-wheels, and after crossing itself, about the sprocket-wheel on the front axle, substantially as and for the purpose set forth.

5. The combination with a motor-vehicle, of two trucks on which said vehicle is pivotally mounted, axles journaled on said trucks and each comprising a rod extending from side to side of the vehicle, divided sleeves encircling said rods and having fixed on their outer ends ground-wheels, beveled gear-wheels fixed on the adjacent ends of said sleeves, sprocket-wheels mounted on the rods intermediate said wheels and carrying beveled pinions engaging the wheels, an endless chain passing about said sprocket-wheels, and means for driving said chain, substantially as described.

6. The combination with a motor-vehicle, of two trucks on which said vehicle is pivotally mounted, axles journaled on said trucks and each comprising a rod extending from side to side of the vehicle, divided sleeves encircling said rods and having fixed on their outer ends ground-wheels, beveled gear-wheels fixed on the adjacent ends of said sleeves, sprocket-wheels mounted on the rods intermediate said wheels and carrying beveled pinions engaging the wheels, an endless chain passing about said sprocket-wheels, means for driving said chain and for turning the trucks simultaneously in opposite directions at the will of the operator to steer the vehicle, substantially as described.

7. The combination of a motor-vehicle, of two trucks on which said vehicle is pivotally mounted, axles journaled on said trucks and having traction-wheels fixed thereon, sprocket-wheels mounted on said axles, a motor carried by the vehicle, two sprocket-wheels carried by the vehicle and provided with intermeshing gear-wheels, gearing driven by the motor for rotating said sprocket-wheels in the same direction, an endless chain passing about said geared sprocket-wheels and the sprocket-wheels on the axles, a swinging frame in which the motor-driven gearing is journaled, and means for adjusting said frame to take up the slack in the endless chain, substantially as described.

8. The combination with a motor-vehicle, of two trucks on which said vehicle is pivotally mounted, axles journaled on said trucks and having traction-wheels fixed thereon, sprocket-wheels mounted on said axles, a motor carried by the vehicle, two sprocket-wheels provided with intermeshing gear-wheels, gearing driven by the motor for rotating said sprocket-wheels in the same direction, a swinging frame in which said gearing is journaled, adjusting-screws for adjusting said frame, and an endless chain passing about said geared sprocket-wheels and the sprocket-wheels of the axles, substantially as described.

9. The combination of a motor-vehicle, of two trucks on which said vehicle is pivotally mounted, axles journaled on said trucks and having traction-wheels fixed thereon, said axles being connected by a sprocket-chain and wheels, a motor carried by the vehicle, two sprocket-wheels carried by the vehicle and provided with intermeshing gear-wheels, gearing driven by the motor for rotating said sprocket-wheels in the same direction, an endless chain passing about said geared sprocket-wheels and the sprocket-wheels on the axles, a swinging frame in which the motor-driven gearing is journaled, and means for adjusting said frame to take up the slack in the endless chain, substantially as described.

10. The combination with a motor-vehicle, of two trucks on which said vehicle is pivotally mounted, axles journaled on said trucks and having traction-wheels fixed thereon, said axles being connected by a sprocket-chain and wheels, a motor carried by the vehicle, two sprocket-wheels provided with intermeshing gear-wheels, gearing driven by the motor for rotating said sprocket-wheels in the same direction, a swinging frame in which said gearing is journaled, adjusting-screws for adjusting said frame, and an endless chain passing about said geared sprocket-wheels and the sprocket-wheels of the axles, substantially as described.

In testimony whereof I have hereunto set my hand in presence of two subscribing witnesses.

FRANK SCHLAIS.

Witnesses:
CHARLES SCHLAIS,
JOSEPH SEKADLO.